(12) United States Patent
Lazarus et al.

(10) Patent No.: US 8,501,863 B2
(45) Date of Patent: Aug. 6, 2013

(54) PAINT

(75) Inventors: Richard M. Lazarus, Temescal Valley, CA (US); Caidian Luo, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 106 days.

(21) Appl. No.: 12/163,739

(22) Filed: Jun. 27, 2008

(65) Prior Publication Data

US 2009/0005484 A1   Jan. 1, 2009

Related U.S. Application Data

(60) Provisional application No. 60/946,946, filed on Jun. 28, 2007.

(51) Int. Cl.
| | |
|---|---|
| C08K 5/00 | (2006.01) |
| C08G 75/02 | (2006.01) |
| C08L 27/00 | (2006.01) |
| C08L 33/00 | (2006.01) |
| C04B 24/26 | (2006.01) |
| C08J 3/00 | (2006.01) |

(52) U.S. Cl.
USPC ............... 524/520; 524/515; 524/523

(58) Field of Classification Search
USPC .................. 524/405, 515, 520, 523
See application file for complete search history.

(56) References Cited

U.S. PATENT DOCUMENTS

| | | | |
|---|---|---|---|
| 3,931,448 A | 1/1976 | Parkinson | |
| 4,143,188 A | 3/1979 | Huber-Nuesch et al. | |
| 4,226,277 A | 10/1980 | Matalon | |
| 4,246,148 A | 1/1981 | Shimp et al. | |
| 4,759,961 A | 7/1988 | Kato et al. | |
| 5,059,264 A | 10/1991 | Sheets | |
| 5,087,405 A | 2/1992 | Maker | |
| 5,162,407 A | 11/1992 | Turner | |
| 5,445,754 A | 8/1995 | Nelson | |
| 5,681,877 A | 10/1997 | Hosotte-Filbert et al. | |
| 5,688,642 A | 11/1997 | Chrisey et al. | |
| 6,068,885 A | 5/2000 | Hartman et al. | |
| 6,069,217 A | 5/2000 | Nae et al. | |
| 6,376,570 B1 | 4/2002 | Zhao et al. | |
| 6,376,579 B1 | 4/2002 | Mishra et al. | |
| 6,395,804 B1 | 5/2002 | Rao et al. | |
| 6,420,479 B1 | 7/2002 | Phan et al. | |
| 6,572,927 B1 | 6/2003 | Pleyers et al. | |
| 6,680,111 B1 | 1/2004 | Leibler et al. | |
| 6,710,112 B1 | 3/2004 | Sandor et al. | |
| 6,933,415 B2 | 8/2005 | Zhao et al. | |
| 7,041,727 B2 | 5/2006 | Kubicek et al. | |
| 7,235,595 B2 | 6/2007 | Hermes et al. | |
| 2001/0051227 A1 | 12/2001 | Jung et al. | |
| 2001/0053449 A1 | 12/2001 | Parekh et al. | |
| 2002/0058110 A1 | 5/2002 | Even et al. | |
| 2002/0061940 A1* | 5/2002 | Lach et al. | 523/160 |
| 2002/0072562 A1 | 6/2002 | Asthana | |
| 2002/0077397 A1 | 6/2002 | Karuga et al. | |
| 2002/0081437 A1 | 6/2002 | Dargontina et al. | |
| 2002/0136900 A1 | 9/2002 | Mallen | |
| 2002/0150689 A1 | 10/2002 | Seibel et al. | |
| 2002/0156163 A1 | 10/2002 | Brandenburger et al. | |
| 2002/0169271 A1 | 11/2002 | Peng et al. | |
| 2002/0171170 A1 | 11/2002 | DeMasi et al. | |
| 2002/0193548 A1 | 12/2002 | Throne et al. | |
| 2003/0054176 A1 | 3/2003 | Pantano et al. | |
| 2003/0088014 A1 | 5/2003 | Edwards et al. | |
| 2003/0158351 A1 | 8/2003 | Smith et al. | |
| 2003/0207035 A1 | 11/2003 | Schmid et al. | |
| 2003/0236340 A1 | 12/2003 | Kubicek et al. | |
| 2004/0005455 A1 | 1/2004 | Stephenson et al. | |
| 2004/0081706 A1 | 4/2004 | Trainer et al. | |
| 2005/0043446 A1 | 2/2005 | Bochan et al. | |
| 2005/0058689 A1* | 3/2005 | McDaniel | 424/426 |
| 2005/0192400 A1 | 9/2005 | Killilea et al. | |
| 2005/0196629 A1 | 9/2005 | Bariatinsky et al. | |
| 2005/0214550 A1 | 9/2005 | Kawamura | |
| 2005/0215708 A1 | 9/2005 | Robertson | |
| 2005/0227100 A1 | 10/2005 | Brandenburger et al. | |
| 2005/0238898 A1 | 10/2005 | Wind et al. | |
| 2006/0003159 A1 | 1/2006 | Hayes et al. | |
| 2006/0029825 A1 | 2/2006 | Chen et al. | |
| 2006/0036056 A1 | 2/2006 | Wu et al. | |
| 2006/0063871 A1* | 3/2006 | Taylor et al. | 524/300 |

(Continued)

FOREIGN PATENT DOCUMENTS

| | | |
|---|---|---|
| AU | 515151 | 3/1981 |
| DE | 1958706 | 3/1971 |

(Continued)

OTHER PUBLICATIONS

U.S. Appl. No. 12/163,452, filed Jun. 27, 2008 entitled "Primer for Composite Building Materials"—Inventor: Yongjun Chen et al.

(Continued)

*Primary Examiner* — Mark Eashoo
*Assistant Examiner* — Angela C Scott
(74) *Attorney, Agent, or Firm* — Knobbe Martens Olson & Bear, LLP

(57) ABSTRACT

A paint composition and formulation for building materials, such as materials that are generally cementitious, gypsum, or of another inorganic building material, including those containing cellulose, glass, steel or polymeric fibers. The paint formulation provides improved weatherability, durability, light stability, freeze-thaw resistance and water resistivity.

5 Claims, 5 Drawing Sheets

U.S. PATENT DOCUMENTS

| | | |
|---|---|---|
| 2006/0105161 A1 | 5/2006 | Brandenburger et al. |
| 2006/0111503 A1 | 5/2006 | Killilea et al. |
| 2006/0122330 A1 | 6/2006 | Wu et al. |
| 2006/0135684 A1 | 6/2006 | Killilea |
| 2006/0135686 A1 | 6/2006 | Killilea et al. |
| 2006/0141261 A1 | 6/2006 | Wind et al. |
| 2006/0167208 A1 | 7/2006 | Garner et al. |
| 2006/0182946 A1 | 8/2006 | Zarb et al. |
| 2006/0202161 A1 | 9/2006 | Share et al. |
| 2006/0207476 A1 | 9/2006 | Coward et al. |
| 2006/0210153 A1 | 9/2006 | Sara et al. |
| 2007/0001343 A1 | 1/2007 | Pulman et al. |
| 2007/0010612 A1 | 1/2007 | Rouge et al. |
| 2007/0027249 A1 | 2/2007 | Killilea |
| 2007/0036903 A1 | 2/2007 | Mayr et al. |
| 2007/0042192 A1 | 2/2007 | Nguyen et al. |
| 2007/0045891 A1 | 3/2007 | Martinoni et al. |
| 2007/0054140 A1 | 3/2007 | Mayr et al. |
| 2007/0065608 A1 | 3/2007 | Niederst |
| 2007/0087146 A1 | 4/2007 | Evans et al. |
| 2007/0110933 A1 | 5/2007 | Share et al. |
| 2007/0110981 A1 | 5/2007 | Killilea et al. |
| 2007/0117928 A1 | 5/2007 | O'Brien et al. |
| 2007/0132158 A1 | 6/2007 | Martinoni et al. |
| 2007/0154643 A1 | 7/2007 | Schmid et al. |
| 2007/0169843 A1 | 7/2007 | Henderleiter |
| 2007/0178239 A1* | 8/2007 | Kestell et al. .............. 427/393.4 |
| 2007/0178294 A1 | 8/2007 | Dargontina et al. |
| 2007/0259166 A1 | 11/2007 | Killilea et al. |
| 2007/0259188 A1 | 11/2007 | Wu et al. |
| 2007/0269660 A1 | 11/2007 | Killilea et al. |
| 2007/0269668 A1 | 11/2007 | Hayes et al. |
| 2007/0275198 A1 | 11/2007 | Share et al. |
| 2007/0282046 A1 | 12/2007 | Killilea et al. |
| 2008/0008895 A1 | 1/2008 | Garner et al. |
| 2008/0009601 A1 | 1/2008 | Killilea et al. |
| 2008/0041003 A1 | 2/2008 | Nowak et al. |
| 2008/0096024 A1 | 4/2008 | Cavallin |
| 2009/0004468 A1 | 1/2009 | Chen et al. |
| 2009/0005494 A1 | 1/2009 | Luo et al. |

FOREIGN PATENT DOCUMENTS

| | | |
|---|---|---|
| EP | 0469295 | 2/1992 |
| JP | 10279831 | 10/1998 |
| JP | 2000327453 | 11/2000 |
| WO | WO-9845222 | 10/1998 |
| WO | WO-0168547 | 9/2001 |
| WO | WO-0228795 | 4/2002 |
| WO | WO-0228796 | 4/2002 |
| WO | WO 2004/087412 | 10/2004 |
| WO | WO-2007022449 | 2/2007 |
| WO | WO-2009006304 | 1/2009 |
| WO | WO-2009006324 | 1/2009 |
| WO | WO-2009006333 | 1/2009 |

OTHER PUBLICATIONS

U.S. Appl. No. 12/163,541, filed Jun. 27, 2008 entitled "Multifunctional Primers"—Inventor: Caidian Luo et al.

Omyacarb 5-FL Product Data Sheet (Nov. 20, 2006) Online at: www.omya-na.com/B2BShrtPr.nsf/(alldocs)/5A3467E5925784DB85256FA900509F1C/$FILE/OMYACARB%205%20-%20FL.pdf.

Schrickel, Jorg. (Feb. 1, 2000) Efficiency and compatability in one polysiloxane antifoam—even the side effects are . . . , Allbusiness.com. Available Online at: www.allbusiness.com/manufacturing/chemical-manufacturing-paint/462854-1.html.

Ahadi, M.M., et al. "OCP Measurement: A Method to Determine CPVC." *Scientia Iranica*, vol. 14(4), pp. 369-372, Aug. 2007.

Millennium Chemicals, "Tiona® 595 Product Data Sheet," Aug. 2002.

* cited by examiner

PAINT

BACKGROUND

This invention relates generally to compositions for surfaces of building materials and further to paint compositions for building materials subject to environmental exposure or weathering.

Surfaces of building materials, such as composite building materials, including fiber cement materials, are subject to external and environmental exposure, such as to ultraviolet (UV) light exposure and to freeze-thaw conditions in wet and salt-containing surroundings. Due to such exposure, the building materials are subject to damage, effecting longevity and making it difficult and expensive to maintain the materials. Fiber cement building materials are particularly challenging materials due to a poor resistance to moisture and soluble salts, such as chlorides. When water or soluble salts ingress, the fiber cement materials lose dimensional stability, strength and such products begin to deteriorate.

SUMMARY

As described herein is a surface composition for building materials (e.g., composite materials, including cementitious materials, gypsum, or other inorganic composite material) that overcomes challenging environment as described above.

Generally, compositions described herein are paints having a high solids content with high stability and high weather resistance (weatherability). The paint described herein imparts improved salt resistance to a wide variety of building material substrates to which it is applied, including a substrate made of a fiber cement material.

In one or more embodiments, a paint composition described herein is multifunctional by serving as a self-cleaning composition that is also scratch resistant, resistant to markings (e.g., graffiti), is UV stable, bioresistant, fire retardant, heat reflective and offers improved insulation value to the substrate upon application.

As described, such a paint composition includes on or about 50-70% solids, about 45-60% solids by volume. The composition generally comprises a polymeric binder that is blend of one or more binders, including a water-borne acrylic, styrene acrylic, siloxane acrylic, fluoropolymer acrylic, epoxy, siloxane, polyester, polyurea or urethane acrylic. The blend is selected by polymeric particle size, film formation, and environmental temperature/conditions. Polymeric particles are typically in the nanometer size range. While polymeric particles in other conventional paint formulations range in size from 150 to 250 nanometers, paint compositions described herein have polymeric particles or a blend of polymeric particles that range from between about 50 to 250 nanometers or less than 250 nanometers in size. The polymeric binder (or blend) is typically provided at a weight percent (wt. %) of less than 60%, preferably at a range at or about 20-55% for a water-based formulation described herein. Such a formulation is able to cure catalytically, chemically, thermally or by radiation.

Those skilled in the art will further appreciate the above-noted features and advantages of the invention together with other important aspects thereof upon reading the detailed description that follows and in conjunction with the drawings

BRIEF DESCRIPTION OF THE DRAWINGS

For more complete understanding of the features and advantages of the inventions described herein, reference is now made to a description of the invention along with accompanying figures, wherein.

DETAILED DESCRIPTION

Figure 1:
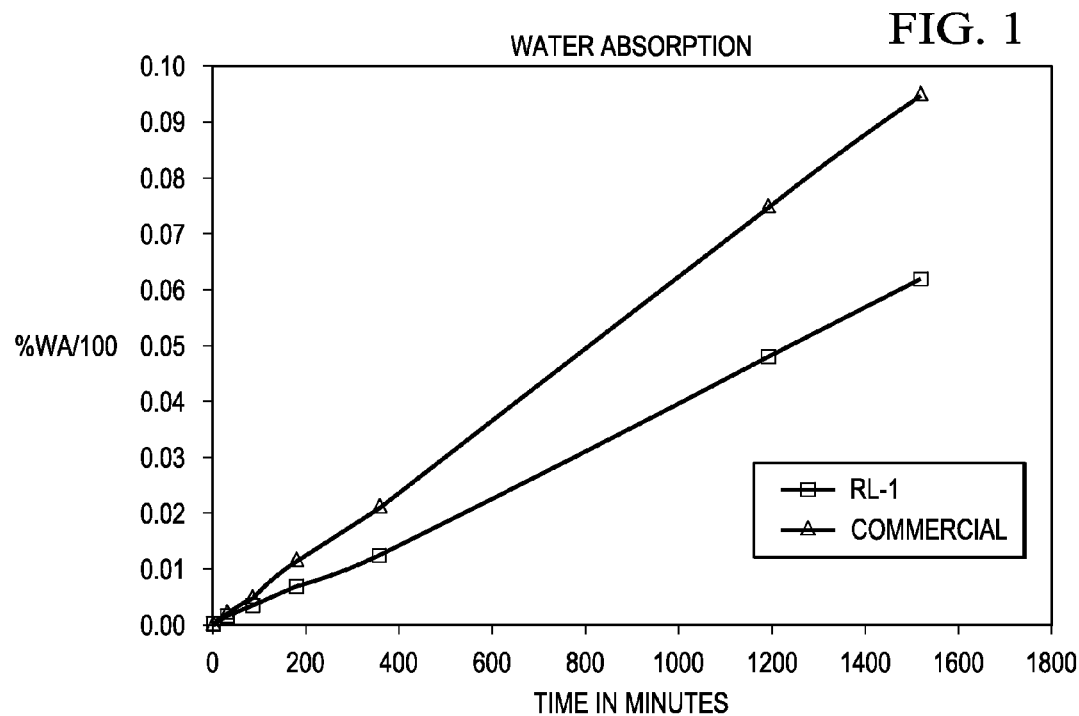
FIG. 1 depicts a representative comparison of water absorption on sealed substrates applied with a paint composition described herein (square) versus another commercial paint (triangle)

Although making and using various embodiments are discussed in detail below, it should be appreciated that the description provides many inventive concepts that may be embodied in a wide variety of contexts. The specific aspects and embodiments discussed herein are merely illustrative of ways to make and use the invention, and do not limit the scope of the invention.

Reference will now be made to the description and drawings. The drawing figures are not necessarily to scale and certain features may be shown exaggerated in scale or in somewhat generalized or schematic form in the interest of clarity and conciseness.

Described herein are paint compositions and formulations that have improved weather resistance and freeze-thaw resistance with superior adhesion to a substrate, particularly in moisture conditions in the presence or absence of soluble salts. A coating as used herein refers to a paint formulation after application to a substrate. A substrate herein is a building material, such as a composite building material, including one of a fiber cement material. Paint compositions, formulations and coatings therefrom as described herein will be suitable for any building product, whether natural, synthetic or composite in nature.

Generally, a paint composition formulation described herein is a water-borne formulation having a binding polymer or mixture of polymers to achieve durability, especially in challenging environments. The binding polymer may be provided as a pure acrylic, a styrene acrylic, a fluoropolymer acrylic, a urethane acrylic, a vinyl acrylic and/or an acrylated ethylene vinyl acetate copolymer or combinations thereof.

The polymer may be derived from at least one acrylic monomer, such as an acrylic acid, acrylic acid ester, methacrylic acid, and methacrylic acid ester. Typically, the binding polymer is derived from one or more monomers, examples of which include polyvinylidine fluoride, styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes. In several preferred embodiments, the binding polymers are selected for degree of hydrophobicity and/or particle size.

The polymer or blend of polymers when desired is selected by polymeric particle size, film formation, and environmental temperature/conditions. Polymeric particles for compositions described herein are typically in the nanometer size range. While polymeric particles in other conventional paint formulations range in size from 150 to 250 nanometers, paint compositions described herein include polymeric particles (or a blend of polymeric particles) that range in size from about 50 to about 250 nanometers or to less than 250 nanometers. The binder of polymeric particles or a blend of polymer particles is typically provided at a weight percent (wt. %) of less than 60%, preferably at a range at or about 20-55% for a water-based coating provided herein.

A formulation described herein further comprises one or more pigments. Pigments provide color, hiding, and/or are present as extenders. Pigments include those in the form of titanium oxide, calcium carbonate, clay, aluminum oxide, silicon dioxide, magnesium oxide, magnesium silicate, barium metaborate monohydrate, sodium oxide, potassium oxide, talc, barytes, zinc oxide, zinc sulfite and mixtures thereof.

Paint formulations further include one or more film-forming aids or coalescing agents. Suitable firm-forming aids or coalescing agents include glycol ethers (e.g., products from Eastman Chemical Company, Kingsport, Tenn., including DB, EB, PM, EP) and ester alcohols (e.g., products from Eastman Chemical Company, Kingsport, Tenn., including Texanol), as examples.

In addition to the above, paint formulations and their embodiments typically include one or more additives included for properties, such as regulating flow and leveling, sheen, foaming, yellowing, resistance to stains/cleaner/burnish/block/mildew/dirt/corrosion, and for retaining color and gloss. Optionally and in some preferred embodiments, formulations herein include additives as coalescing agents, dispersants, anti-blistering agents, surfactants, rheology modifiers, defoamers, thickeners, biocides/anti-fungal/anti-mildew agents, colorants, waxes, perfumes and co-solvents.

Examples of suitable surface-active dispersing or wetting agents include those available under the trade designations, such as STRODEX™ KK-95H, STRODEX™ PLF100, STRODEX™ PKOVOC, STRODEX™ LFK LFK70, STRODEX™ SEK50D, and DEXTROL® OC50 (trademarks of Dexter Chemical LLC, Wilmington, Del.); HYDROPALAT™ 100, HYDROPALAT™ 140, HYDROPALAT™ 44, HYDROPALAT™ 5040 and HYDROPALAT™ 3204 (trademarks of Cognis Corp., Monheim, Germany); LIPOLIN™ A, DISPERS™ 660C, DISPERS™ 715W (trademarks of Evonik Degussa GmbH, Germany); BYK® 156, BYK® 2001 and ANTI-TERRA™ 207 (trademarks of Byk-Cera, Germany); DISPEX™ A40, DISPEX™ N40, DISPEX™ R50, DISPEX™ G40, DISPEX™ GA40, EFKA® 1500, EFKA® 1501, EFKA® 1502, EFKA® 1503, EPKA™ 3034, EFKA® 3522, EFKA® 3580, EFKA™ 3772, EFKA® 4500, EFKA® 4510, EFKA® 4520, EFKA® 4530, EFKA® 4540, EFKA® 4550, EFKA® 4560, EFKA® 4570, EFKA® 6220, EFKA® 6225, EFKA® 6230 and EFKA® 6525 (trademarks of Ciba Specialty Chemicals, Basil, Switzerland); SURFYNOL™ CT-111, SURFYNOL™ CT-121, SURFYNOL™ CT-131, SURFYNOL™ CT-211, SURFYNOL™ CT 231, SURFYNOL™ CT-136, SURFYNOL™ CT-151, SURFYNOL™ CT-171, SURFYNOL™ CT-234, CARBOWET™ DC-01, SYRFYNOL™ 104, SURFYNOL™ PSA-336, SURFYNOL™ 420, SURFYNOL™ 440, ENVIROGEM™ AD-01 and ENVIROGEM™ AE01 (trademarks of Air Products and Chemicals, Inc., Lehigh Valley, Pa.); TAMOL™ 1124, TAMOL™ 165A, TAMO™ 850, TAMOL™ 681, TAMOL™ 731 and TAMOL™ SG-1 (trademarks of Rohm & Haas Company, Philadelphia, Pa.); IGEPAL™ CO-210, IGEPAL™ CO-430, IGEPAL™ CO-630, IGEPAL™ CO-730, and IGEPAL™ CO-890 (trademarks of Rhodia Inc., Cranbury, N.J.); T-DET™ and T-MULZ™ (trademarks of Harcros Chemicals Inc., Kansas City, Kans.).

Examples of suitable defoamer's include but are not limited to BYK™ 018, BYK® 019, BYK® 020, BYK® 022, BYK® 025, BYK® 032, BYK® 033, BYK® 034, BYK® 038, BYK® 040, BYK® 060, BYK® 070 and BYK® 077 (trademarks of Byk-Cera, Germany); SURFYNOL™ DF-695, SURFYNOL™ DF-75, SURFYNOL™ DF-62, SURFYNOL™ DF-40 and SURPYNOL™ DF-110D (trademarks of Air Products and Chemicals, Inc., Lehigh Valley, Pa.); DEE FO® 3010A, DEE FO® 2020E/50, DEE FO® 215, DEE FO® 806-102 and AGITAN™ 31BP, AGITAN™ 731 (trademarks of Munzing Chemie GmbH, Germany); EFKA® 2526, EFKA® 2527 and EFKA® 2550 (trademarks of Ciba Specialty Chemicals, Basil, Switzerland); TEGO® Foamex 8050, TEGO® Foamex 1488, TEGO® Foamex 7447, TEGO® Foamex 800, TEGO® Foamex 1495 and TEGO® Foamex 810 (trademarks of Evonik Degussa GmbH, Germany); FOAMASTER® 714, FOAMASTER® A410, FOAMASTER® 111, FOAMASTER® 333, FOAMASTER® 306, FOAMASTER® SA-3, FOAMASTER® AP, DEHYDRAN® 1620, DEHYDRAN® 1923 and DEHYDRAN® 671 (trademarks of Cognis Corp., Monheim, Germany).

A thickener and rheology modifier is included for improving spreading, handling, and application of the paint formulation, when desired. Preferably, the thickener is a non-cellulosic thickener due to preferred non moisture swelling characteristics. Associative thickeners such as, for example, hydrophobically modified alkali swellable acrylic copolymers and hydrophobically modified urethane copolymers generally impart more Newtonian rheology to emulsion paints compared to conventional thickeners such as, for example, cellulosic thickeners. Cellulosic thickeners perform by swelling in water and are undesirable in several preferred embodiments as further described herein. Representative examples of suitable associative thickeners used herein include Acrysol™ RM 8W and Acrysol™ RM-2020 NPR (trademarks of Rohm & Haas Company, Philadelphia, Pa.).

A paint when suitably prepared preferably presents with a low gloss less than or equal to about 20 units, as determined at 85 degrees Fahrenheit on a micro-tri-gloss meter according to ASTM D523 when measured on a coated fiber cement substrate. In several embodiments, the gloss is from about 8 to 18 units. A flatter/lower gloss may also be prepared, for example, by increasing pigment volume concentration (PVC). Preferably, PVC is at least 20% and typically less than 40% to provide a preferred binder concentration and a stable formulation without settling or foaming.

Paint formulations described may also include other additives useful with paints, such as plasticizer, anti-foam agent, pH adjuster (amine or ammonia), tinting color, and biocide. Such coating additives are typically present in the formulation in an amount from about 0 to about 18% by weight or up to 18 by weight and from about 1 to about 15% by weight based on the total weight of the formulation.

In addition, a formulation described herein may include one or more functional extenders to increase coverage, reduce cost, achieve durability, alter appearance, control rheology, and/or influence other desirable properties. Examples of functional extenders include, for example, barium sulphate, aluminum silicate, magnesium silicate, barium sulphate, calcium carbonate, clay, gypsum, silica, and talc.

In several embodiments, it will be desirable to include a biocide or mildewicide, or fungicide to the formulations described herein. Preferred examples include but are not limited to barium sulphate, ROZONE™ 2000, BUSAN™ 1292, BUSAN 11M1, BUSAN 11M2, and BUSAN 1440 (trademarks of Rohm & Haas Company, Philadelphia, Pa., or its subsidiaries or affiliates); POLYPHASE® 663 and POLYPHASE® 678 (trademark of Troy Chemical Corporation, Newark, N.J.); and KATHON™ LX (trademark of Rohm & Haas Company, Philadelphia, Pa., or its subsidiaries or affiliates.)

Paint compositions herein are typically formulated to include at least about 30% by volume of dry solids. The balance of the paint composition is water. Water is present with the binding polymer when provided in a dispersion and in other components of the coating composition. Water is generally also added separately. The added water is typically from about 5% to about 60% by weight, and from about 8% to about 35% by weight. Accordingly, a coating composition described herein typically has from about 30% to about 80% total solids or from about 40% to about 70% by weight.

Ingredients of formulations for paint compositions described herein are identified in TABLE 1.

TABLE 1

| | Component | Acceptable range (wt. %) | A preferred range (wt. %) |
|---|---|---|---|
| carrier | water | 20-60 | 25-55 |
| binder | acrylic polymer | 10-40 | 15-30 |
| pigment | titanium dioxide (TiO$_2$), SiO$_2$, calcium carbonate, talc | 10-24% | 15-20 |
| additive | dispersant, defoamer, biocide/anti-fungal, rheology modifier, coalescing agent | 0-18% | 2-6% |

A representative embodiment of a paint composition formulation described herein is provided in TABLE 2 which includes the amount of each component as a wt. % based on total solids.

TABLE 2

| Component | Amount (wt. %.) |
|---|---|
| water | <45 |
| binding polymer | 15-30 |
| pigment | 35-45 |
| dispersant | <2 |
| defoamer | <2 |
| rheology modifier | <4 |
| coalescing agent | 1-3 |
| additional additives [amine] | <2 |

Another representative embodiments and ranges of a paint composition formulation as described herein is provided in TABLE 3, which also shows ranges of components described therein.

TABLE 3

| Component | wt. (%) |
|---|---|
| binding polymer A | 20 to 30 |
| binding polymer B | 0.1 to 2.0 |
| pigment | 35 to 50 |
| dispersant | 0.5 to 2.0 |
| defoamer | 0.5 to 2.0 |
| rheology modifier | 0.1 to 1.5 |
| coalescing agent | 1.0 to 3.0 |
| addition additives [amine] | 0.2 to 1.5 |

Yet another representative embodiments and ranges of a paint composition formulation as described herein is provided in TABLE 4, which also shows ranges of components described therein.

TABLE 4

| Component | wt. (%) |
|---|---|
| binding polymer A | 14 to 30 |
| binding polymer B | 0.5 to 3.0 |
| binding polymer C | 0.5 to 3.0 |
| pigment | 35 to 50 |
| dispersant | 0.5 to 2.0 |
| defoamer | 0.5 to 2.0 |
| rheology modifier | 0.1 to 1.5 |
| coalescing agent | 1.0 to 3.0 |
| addition additives [amine] | 0.2 to 1.5 |

In one or more embodiments, a paint formulation is prepared by a non-typical dispersion process. Whereas, a typical process relies on water as the dispersion medium. As viscosity aids in dispersion, thickeners are then added to the water in this typical process. In most cases the thickener is a cellulosic compound that swells in water. A dispersant, coalescent, and several other additives are further mixed in the water. Then at high sheer speed, the prime pigment is dispersed to form what is commonly referred to as a pigment paste. Later, in the typical dispersion process, the pigment paste is let down (diluted) with a polymer and additional additives such as rheology modifiers.

With paint formulations described herein, desirable properties are best achieved with a paint that is not water sensitive. Therefore, the previously described process that incorporates cellulosic thickeners is not desirable and not used. Instead, a portion of the water is replaced by a polymer when dispersing the pigment. In addition, an additive, such as a pigment dispersing aid is included and is typically a water sensitive salt such as a sodium or potassium salt of an organic compound. Examples include, but are not limited to, Rhodoline™ Colloids 226/35 (potassium salt and a trademark of Rhodia Chimie, France), Tamol® 850 and Tamol® 960 (sodium salt of polyacrylic acid and registered trademarks of Rohm & Haas Company, Philadelphia, Pa.). To best achieve desired formulations, the pigment dispersing aid is selected from those known to be less sensitive to water.

When coating a building product with the desired formulation prepared as described, at least one layer is coated on a surface of the substrate requiring a coating to impart improved weather resistance and freeze-thaw resistance to the substrate. Providing improved weather resistance and freeze-thaw resistance to a building products comprises providing a paint formulation described herein to a substrate surface and allowing said resulting paint formulation to cure and form a coating having a durable, weather resistant surface.

Paint formulations described herein are applied to a surface of a substrate using a brush, blade, roller, sprayer (e.g., air-assisted or airless, electrostatic), vacuum coater, curtain coater, flood coater or any suitable device that promotes an even distribution of the paint formulation over the surface, even if the surface is damaged, worn, or cracked. The paint formulation may be applied to provide a smooth surface, colored surface or textured surface. A portion or an entire surface of the substrate may be coated at one time. In addition or as an alternative, all or a portion of the surface may be coated more than one time to achieve the desired thickness, gloss, and/or surface effect. The amount of coverage obtained by a quantity of the paint composition will vary depending on the desire and/or condition of the surface to be covered and the thickness of the coating applied.

In practical use, a paint composition as described is a stable liquid that may be applied to a wide variety of materials such as, for example, paper, wood, concrete, metal, glass, gypsum, ceramic, plastic, plaster, and roofing substrates such as asphaltic coatings, roofing felts, foamed polyurethane insulation; or to previously painted, primed, undercoated, worn, or weathered substrates.

Assessments of water and salt absorption, freeze-thaw resistance, film formation, thermal stability, flexibility and light durability were made with formulations described herein.

Figure 2:
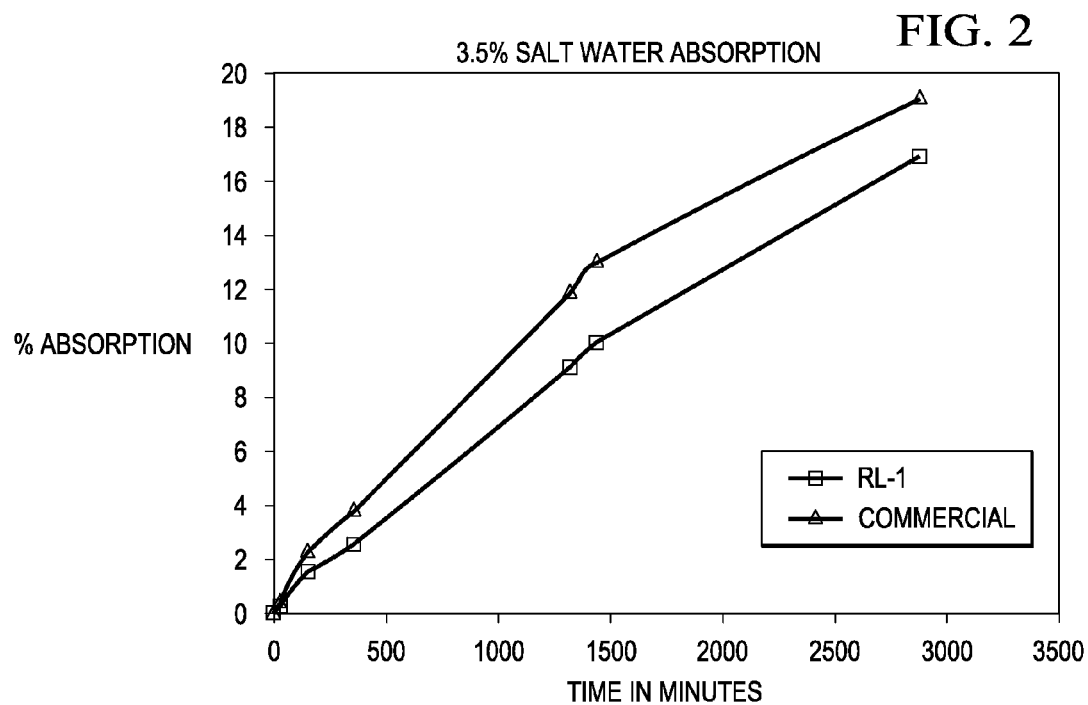
FIG. 2 depicts a representative comparison of salt absorption on sealed substrates applied with a paint composition described herein (square) versus another commercial paint (triangle)

For FIGS. 1-2, several raw specimens were initially sealed on six sides and then further coated with either a paint formulation herein having a high solid content of about 67% or with another commercial paint. The commercial paint was one with water-borne acrylic binders. For all specimens, the paint layer applied was approximately 1.5-2.0 mil thick on the face of the substrate and 0.5-1.0 mil thick on the back. Specimens were dried and then soaked for up to 24 hours in water (FIG. 1) or for about 48 hours in salt water solution of 3.5% sodium chloride (FIG. 2). Each specimen was weighed before and after soaking in water to determine percent absorption. The specimens were a composite fiber cement material. Paper towels were used to remove water from the surface of each specimen after soaking. Under the conditions described, the figures illustrate superior durability and resistance to water or salt water ingress of substrates surfaced with a paint formulation described herein. The figures show both durability and water/salt water resistance of the described paint formulation surpassed that of the commercial paint.

Figure 3:
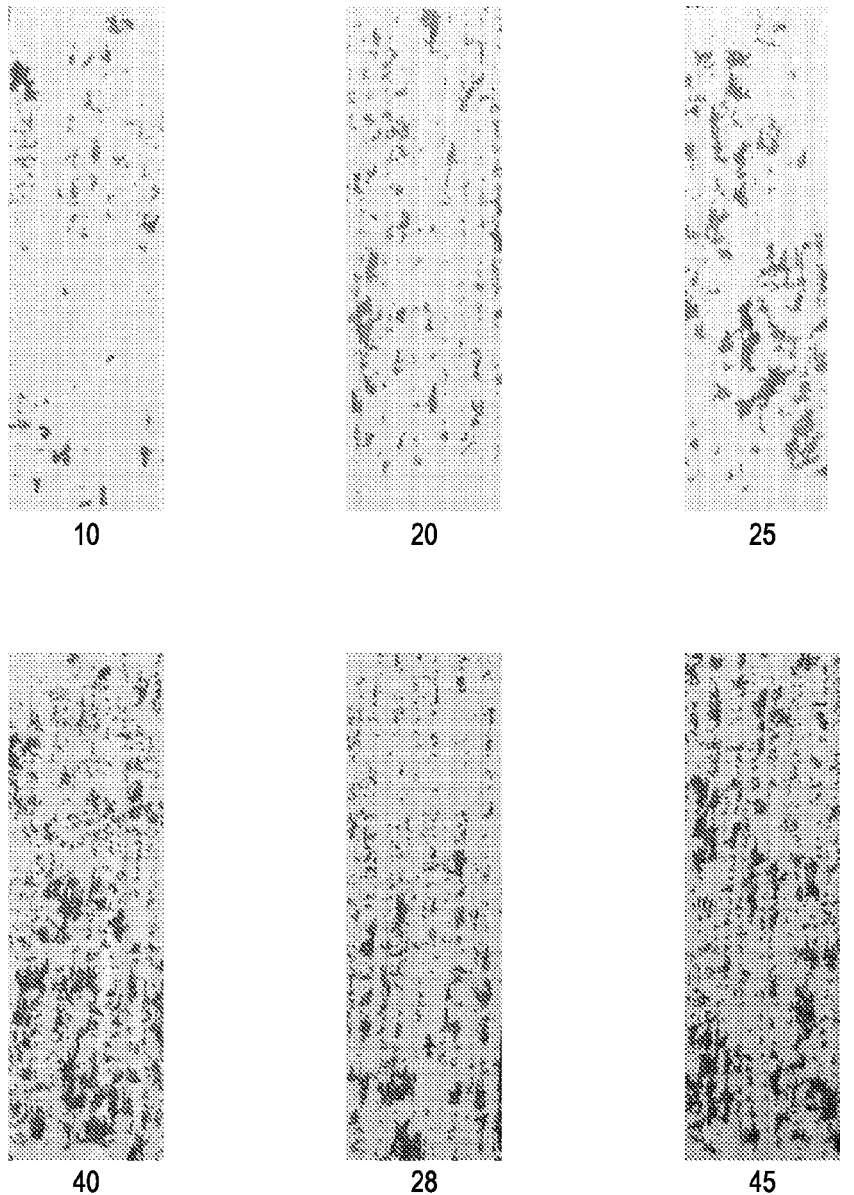
FIG. 3 depicts sealed substrates of sealed substrates after exposure to 100 freeze-thaw cycles in a salt water solution in which the top substrate is a representative substrate with a paint compositions described herein applied to its surface and the bottom substrate has another commercial paint applied to its surface.
Figure 4:
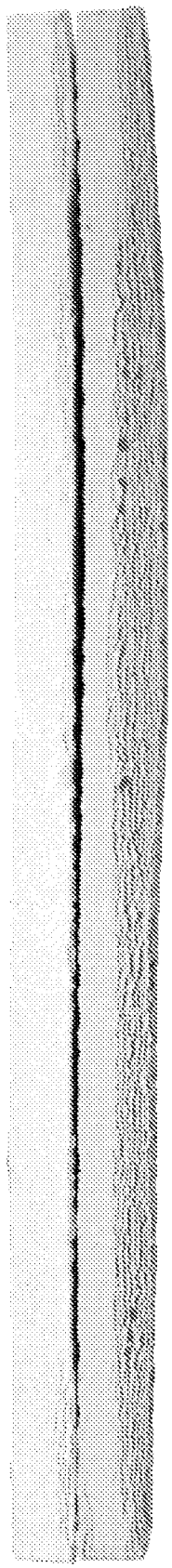
FIG. 4 depicts adhesion loss of sealed substrates after exposure to 100 freeze-thaw cycles in a salt water solution in which the top set of three images is a representative substrate with a paint compositions described herein applied to its surface and the bottom set of three images has another commercial paint applied to its surface.

For FIGS. 3-4, specimens were initially sealed on six sides and then coated on six sides with either a paint formulation herein having a high solid content of about 67% or with another commercial paint that was either a water-borne acrylic binder or a styrene-modified acrylic. For all specimens, the paint layer applied was approximately 1.5-2.0 mil thick on the face of the substrate and 0.5-1.0 mil thick on the back. The specimens were a composite fiber cement material. Specimens were exposed to 100 freeze-thaw cycles in a salt water solution of 3.5% sodium chloride using an environmental chamber. FIG. 3 shows representative images showing superior performance of a paint formulation described herein (top) as compared with a water-borne acrylic commercial paint (bottom), which underwent severe cracking of the painted surface after the freeze-thaw cycles. After the 100 freeze-thaw cycles, adhesion loss of each specimen was measured using an adhesion assessment modified from ASTM D3359 (samples were not cross cut). For assessment, a 1 inch wide adhesive of 3M® Scotch® tape No. 250 was directly applied to the coated surface after the surface was soaked in tap water for about 24 hours. The tape was rolled with a 10 lb. rubber roller for 10 cycles to promote adhesion. Tape was then removed at a 90 degree angle. FIG. 4 shows representative images illustrating less damage to the painted surface of a formulation described herein (top images) as compared with the commercial paint (bottom images).

QUV weathering was performed in an accelerated weathering chamber with UVB bulbs that allowed a flexible mix of UV light, temperature and moisture conditions. The chamber is used to accelerate damage caused by sunlight, rain and condensed surface moisture or dew. Briefly, samples were sealed and painted with a paint composition described herein (represented by squares in FIGS. 6-8) or another commercial paint (represented by triangles in FIGS. 6-8) then subjected to alternating cycles of light and moisture at controlled elevated temperatures. Each sample was painted on its face to a dry film thickness of 1.5 to 2.0 mils. For comparison, selected conditions were the same for comparative samples and continued for up to 2468 hours.

Sunlight durability is an important feature of paints and coatings, especially when the paint and coating is used for aesthetic purposes, such as an exterior coating for buildings. Sunlight durability is commonly measured by evaluating change in gloss and color relative to the amount of sunlight striking the surface. QUV weathering using UVB bulbs, which also incorporates a cycle with moisture exposure, is a common accelerated sunlight durability test. In the QUV test, a change in gloss indicates either polymer film or pigment break down or both. Pigment change and polymer breakdown are indicated by the changes ($\Delta$) in L (light to dark), a (red to green), and b (yellow to blue).

Figure 5:
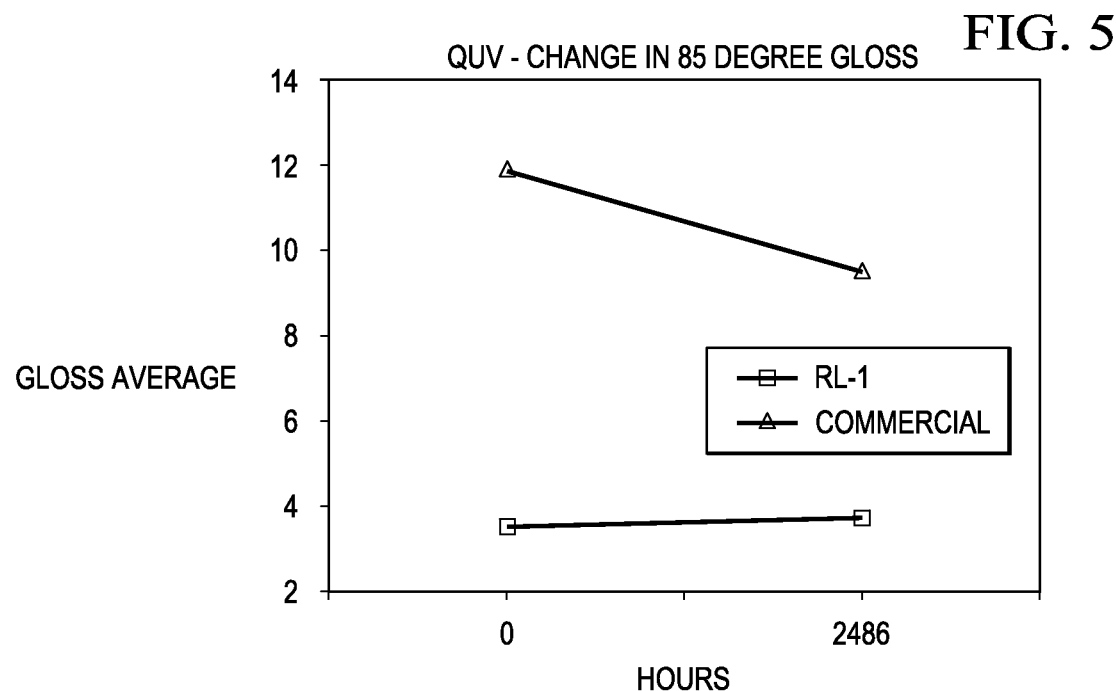
FIG. 5 depicts sheen (gloss) changes over time under conditions of sunlight and a temperature of 85 degrees Fahrenheit for a paint composition described herein (square) as compared with another commercial paint (triangle)
Figure 6:
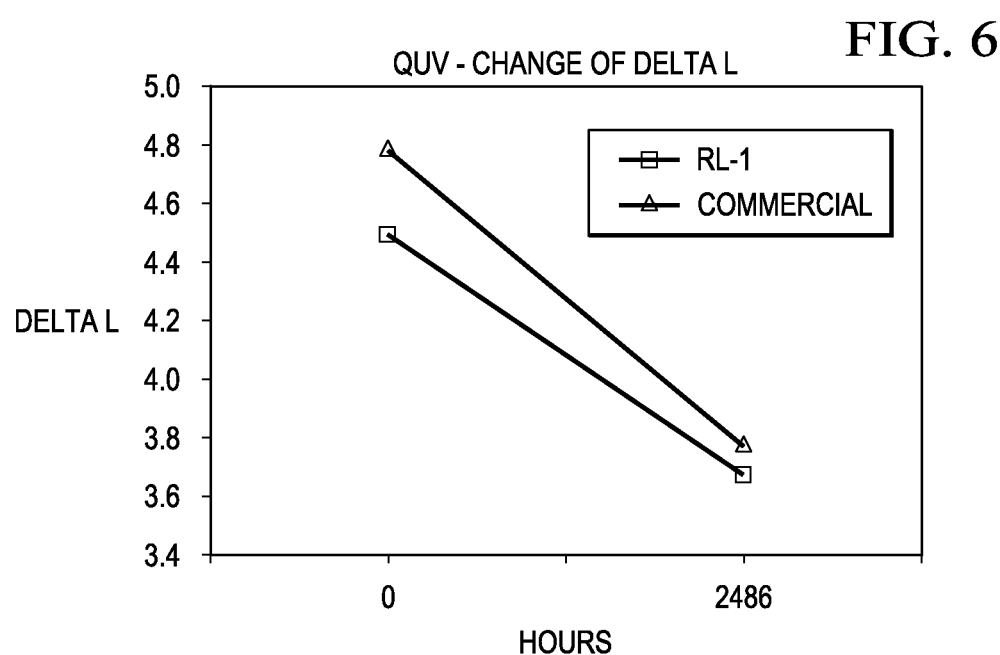
FIG. 6 depicts a change ($\Delta$) L color graph over time under sunlight conditions for a paint composition described herein (square) as compared with another commercial paint (triangle)
Figure 7:
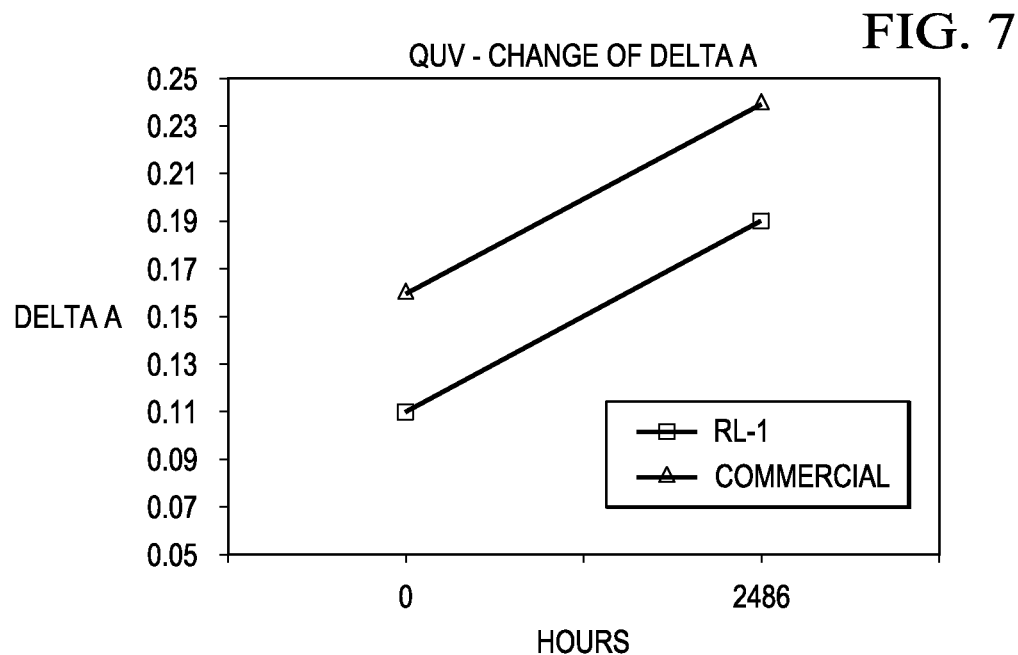
FIG. 7 depicts a $\Delta a$ color graph over time under sunlight conditions for a paint composition described herein (square) as compared with another comparative paint (triangle)
Figure 8:
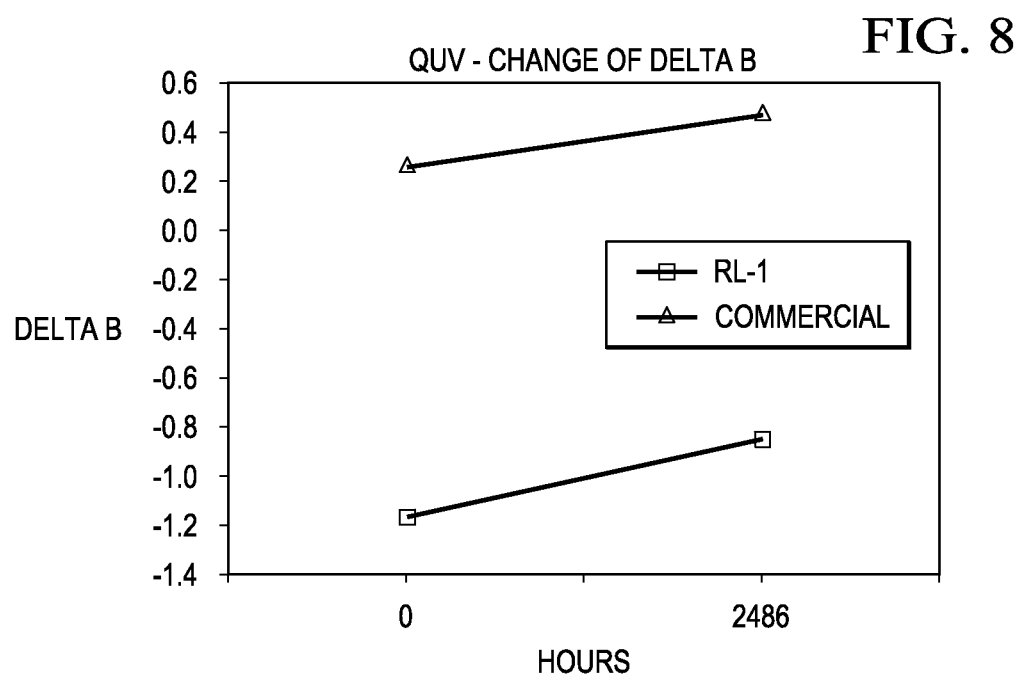
FIG. 8 depicts a $\Delta b$ color graph over time under sunlight conditions for a paint composition described herein (square) as compared with another comparative paint (triangle).

FIG. 5 depicts sheen (gloss) changes over time under conditions of sunlight as measured with a micro-tri-gloss meter at 85 degrees measurement angle. FIG. 6 depicts $\Delta L$ color graph changes over time under sunlight conditions. FIG. 7 depicts $\Delta a$ color graph over time under sunlight conditions. FIG. 8 depicts $\Delta b$ color graph over time under sunlight conditions.

The changes in gloss or color are minimal in formulations described herein. Because sunlight durability influences long term durability in freezing and thawing environments and sunlight can cause micro-cracking of paint polymer films which will lead to ingress of water and/or moisture into the substrate, the performance record of formulations described herein show that it is withstands sunlight well. Thus, paint films, such as those described herein, that exhibit improved resistance to micro-cracking in sunlight should improve the freeze thaw resistance of the substrate on which they are coated. Paints described herein resist micro-cracking and the substrates on which they are coated demonstrate greater freeze thaw resistance after they have been exposed to accelerated UV aging than do substrates coated with other more commercial paints which have been similarly exposed.

The specimens used in the examples above was representative of a fiber cement building material. The fiber cement building material may be a porous material comprising one or more different materials such as a gypsum composite, cement composite, geopolymer composite or other composites having an inorganic binder. The surface of the material may be sanded, machined, extruded, molded or otherwise formed into any desired shape by various processes known in the art. The fiber cement building materials may be fully cured, partially cured or in the uncured "green" state. Fiber cement building materials may further include gypsum board, fiber cement board, fiber cement board reinforced by a mesh or continuous fibers, gypsum board reinforced by short fibers, a mesh or continuous fibers, inorganic bonded wood and fiber composite materials, geopolymer bonded wood and fiber boards, concrete roofing tile material, and fiber-plastic composite material. Preferred fibers include various forms of cellulose fibers, such as treated or untreated, bleached or unbleached Kraft pulp. In addition, other forms of fibers may be used. Suitable examples are those from ceramic, glass, mineral wool, steel, and synthetic polymers (e.g., polyamides, polyester, polypropylene, polymethylpentene, polyacrylonitrile, polyacrylamide, viscose, nylon, PVC, PVA, rayon, glass ceramic, carbon, any mixtures thereof).

Any additional additive may be optionally incorporated into a composite material including but not limited to density modifiers, dispersing agents, silica fume, geothermal silica, fire retardant, viscosity modifiers, thickeners, pigments, colorants, dispersants, foaming agents, flocculating agents, waterproofing agents, organic density modifiers, aluminum powder, kaolin, alumina trihydrate, mica, metakaolin, calcium carbonate, wollastonite, polymeric resin emulsions, hydrophobic agents, and mixtures thereof.

As described, a paint composition described herein is one that coalesces well and improves water/salt water freeze thaw resistance as compared with an alternative commercial paint having inferior freeze thaw resistance. Similarly, a paint composition herein shows superior water resistance and light stability as compared with an alternative paint commercially available yet having inferior properties, such as poor durability, light stability and water resistance.

A paint composition and formulation herein is particularly useful as a paint for fiber cement building materials, such as composites of gypsum or cement. The paint composition may also be utilized with other surfaces as a topping, sealer, or covering for concrete surfaces. The paint composition may also be applied to concrete walls, walks, and may include an aggregate to the mixture to alter the finish or provide a texture. Primed or unprimed building materials may be coated with at least one paint composition described herein.

It is desirable to provide a paint composition that when applied to surfaces of fiber cement building materials would protect the building material and provide benefits to the building materials, especially when exposed to external or challenging environmental conditions, such as prolonged sunlight, cold temperatures, moisture and water, freeze-thaw conditions in the presence or absence of soluble salts. The paint composition when applied to surfaces of building materials will protect the building material from external and environmental exposure and provide benefits to the coated product, especially when exposed to challenging environmental conditions or where soluble salts (e.g., chlorides, nitrates, sulfates) are present.

Embodiments of the paint composition described herein provide certain improved physical and chemical properties as compared with current formulations. Physical properties include durability, water-resistive and UV resistance properties. The paint composition as designed will also offer to cementitious substrates a suitable coating for preventing salt deterioration, efflorescence and water absorption.

Chemical properties of the compositions include curing by heat curing, dual-curing, UV curing, EB curing and other curing technologies within a thermoplastic or thermosetting system.

An example of a paint preparation is provided. Into a stainless steel vessel, 302 g acrylic polymer A and 58 g distilled water were charged. A cowels blade at 675 rpm was used to blend the above. While at 675 rpm, 8.8 g dispersant, 6 g amine and 7.9 g defoamer were added. After mixing for a few minutes, the rpm of the blade was increased to 2035 rpm and $TiO_2$ was added. After dispersing the 200 g $TiO_2$, the hegman was less than three. Talc (135 g), calcium carbonate (78 g) and barium metaborate monohydrate (78 g) were then added as a blend over a five minute time period followed by continued mixing for about 10 minutes. At that time, the remaining acrylic polymer A (134 g) and acrylic Polymer B (108 g) were added. As an alternative, the remaining acrylic polymer A, polymer B (54 g) and fluoro-acrylic polymer C (54 g) were added. This was followed by addition of a coalescing agent (25 g) after about 5 minutes.

A sealer was applied to six sides of a 5/16"×8.25"×12" uncoated fiber cement plank (e.g., Select Cedarmill©, James Hardie, Mission Viejo, Calif.) to a DFT of 0.4-0.7 and the sealer was dried to 160-180° F. board surface temperature (BST). The sealed substrates were painted by applying two coats of paint formulated according to the above example. Paint was applied to the top surface of the substrate at a weight equivalent to 0.0009 mil DFT and allowed to dry to 160-180° F. BST in a track convection oven after each coat. The edges were coated once at the first face coat step. The back of each sample was coated with a paint weight equivalent to 0.65 mil DFT at the same time the face received the second coat. The sample was then dried to 160-180° F. BST in the convection oven. All samples were allowed to cool and equilibrate prior to further testing or use. The paint was found to increase durability of the fiber cement substrate.

Paint compositions described herein improve service life of building materials to which they are applied and are capable of maintaining superior contact with a surface of the building material, maintaining integrity of the surface and serving as an exterior coating. When applied to a surface of a building material, paint compositions herein effectively block moisture and soluble salts from penetrating the building material. Such paints described herein resists water and soluble salt ingress into the substrate, even in freeze-thaw conditions. The paint composition formulation has low VOC applications. When prepared and applied to a building material, the paint composition has good wet and dry adhesion to the fiber cement building material and superior adhesion and durability under freeze-thaw conditions in either fresh water or salt water.

Although the foregoing description of embodiments has shown, described and pointed out certain novel features of the invention, it will be understood that various omissions, substitutions, and changes in the form of the detail as illustrated as well as the uses thereof, may be made by those skilled in the art, without departing from the scope of the invention. Particularly, it will be appreciated that the preferred embodiments may manifest itself in other shapes and configurations as appropriate for the end use of the article made thereby.

The invention claimed is:
1. A paint composition for a building material comprising:
a first polymer, wherein the first polymer comprises about 20 to 30 weight percent of the total solids in the paint composition, wherein the first polymer is a fluoro-acrylic polymer;
a second polymer, wherein the second polymer comprises about 0.1 to 2.0 weight percent of the total solids in the paint composition, wherein the second polymer is an acrylic polymer selected from group consisting of styrene acrylic, siloxane acrylic, epoxy acrylic, polyester acrylic, polyuria acrylic and urethane acrylic;
a pigment, wherein the pigment comprises about 35 to 50 weight percent of the total solids in the paint composition;

a pigment dispersant, wherein the pigment dispersant comprises about 0 to 2.0 weight percent of the total solids in the paint composition;

water; and wherein the pigment is dispersed in a mixture of water and a portion of the first polymer such that the portion of the first polymer provides a dispersion medium for the pigment and imparts rheology to the mixture, wherein the second polymer and the remaining portion of the first polymer function as a binding polymer for the paint composition.

2. The paint composition of claim 1, wherein the paint composition further comprises an amine and a defoamer.

3. The paint composition of claim 1, wherein the paint composition further comprises talc, calcium carbonate and barium metaborate monohydrate.

4. The paint composition of claim 1, wherein the paint composition does not include a cellulosic thickener.

5. The paint composition of claim 1, wherein the paint composition has a solid content of about 67%.

* * * * *